April 6, 1943.  P. W. HOSHOR  2,315,707
DEVICE FOR CORRECTING THE UNEVEN WEAR OF BRAKE SHOES
Filed Feb. 24, 1942  2 Sheets-Sheet 1

INVENTOR.
Perry W. Hoshor
BY
Victor J. Evans & Co.
ATTORNEYS

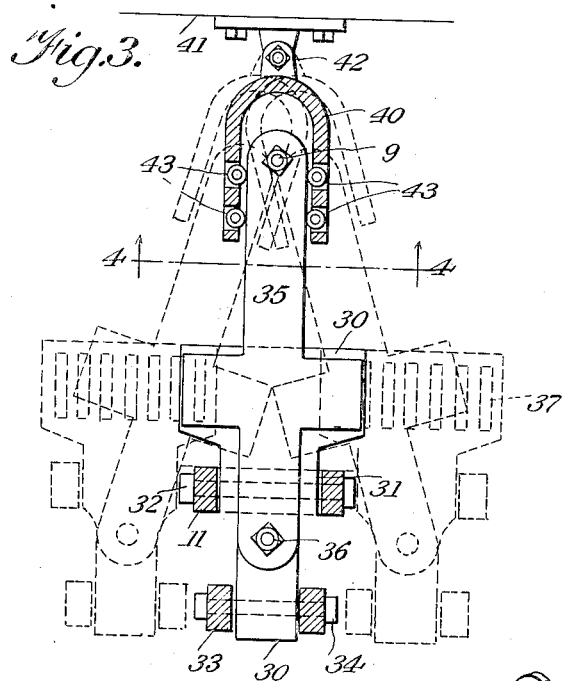
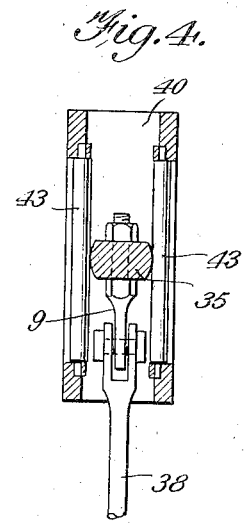
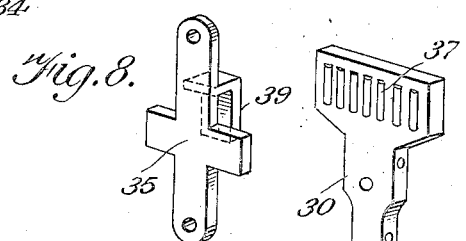
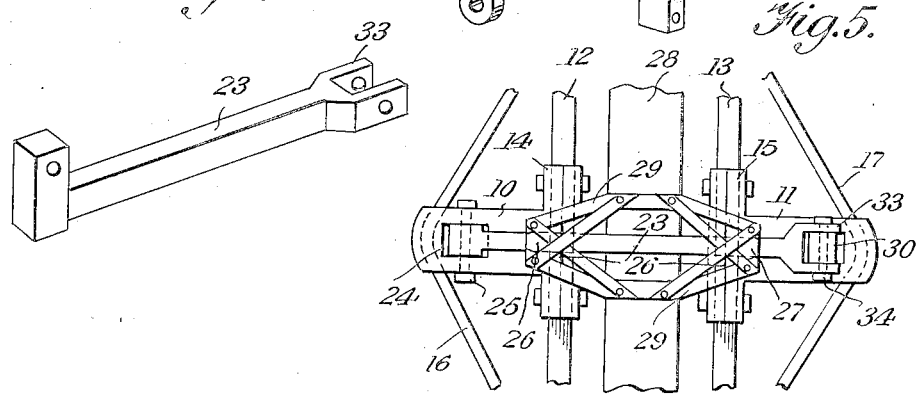

Patented Apr. 6, 1943

2,315,707

UNITED STATES PATENT OFFICE 2,315,707

DEVICE FOR CORRECTING THE UNEVEN WEAR OF BRAKE SHOES

Perry W. Hoshor, Albuquerque, N. Mex.

Application February 24, 1942, Serial No. 432,159

3 Claims. (Cl. 188—52)

This invention relates to a device for correcting the uneven wear of brake shoes and has for an object to provide a device of this character in which an L-shaped push rod is utilized to eliminate several inches in the horizontal movement of an operating lever, the push rod being so braced and fastened to the bottom of the truck bolster as to prevent it from turning to the right or to the left, which turning movement in conventional mechanism is the cause of more wear on one side of the brake shoes than on the other.

A further object is to provide a guide and an extension of the operating lever to hold the latter in position when rounding curves with loaded or empty cars, movement of the operating lever back and forth on a horizontal line taking care of all necessary extra length in movement of these parts.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 3 is a cross sectional view taken on the line 3—3 of Figure 2.

Figure 4 is a detail horizontal sectional view taken on the line 4—4 of Figure 3.

Figure 5 is a detail bottom plan view showing the braces for securing the push rod to the bolster in such manner as to prevent the push rod from turning to the right or to the left.

Figure 6 is a detail perspective view of the L-shaped push rod.

Figure 7 is a detail perspective view of the operating lever extension.

Figure 8 is a detail perspective veiw of the operating lever.

Figure 1:
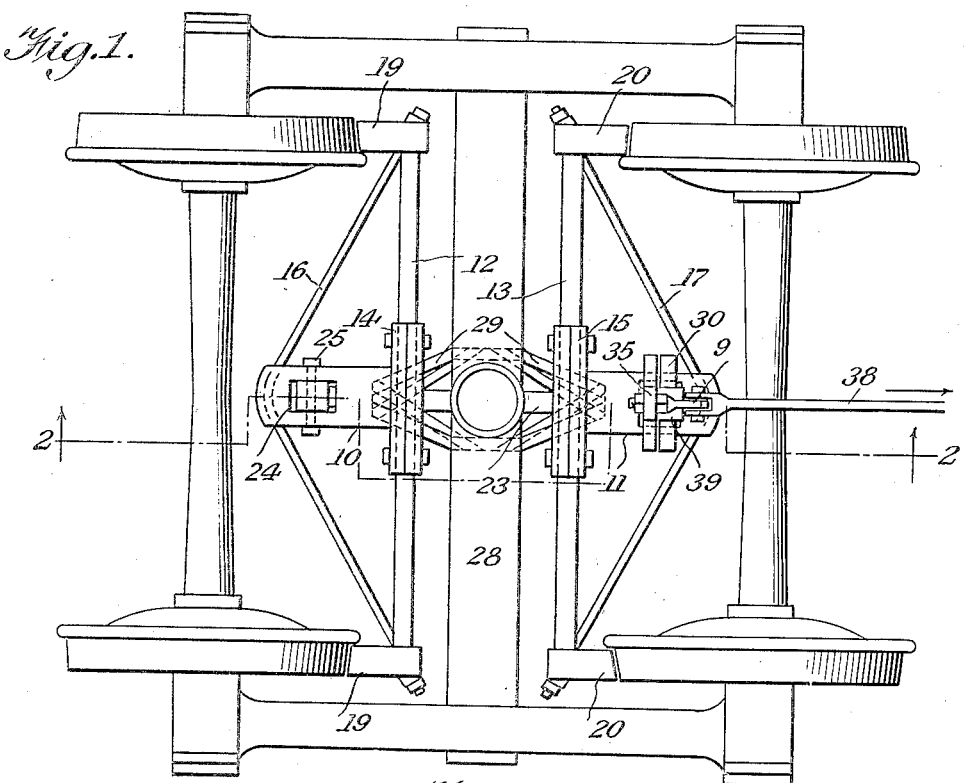
Figure 1 is a top plan view of a device for correcting the uneven wear of brake shoes, constructed in accordance with the invention.
Figure 2:
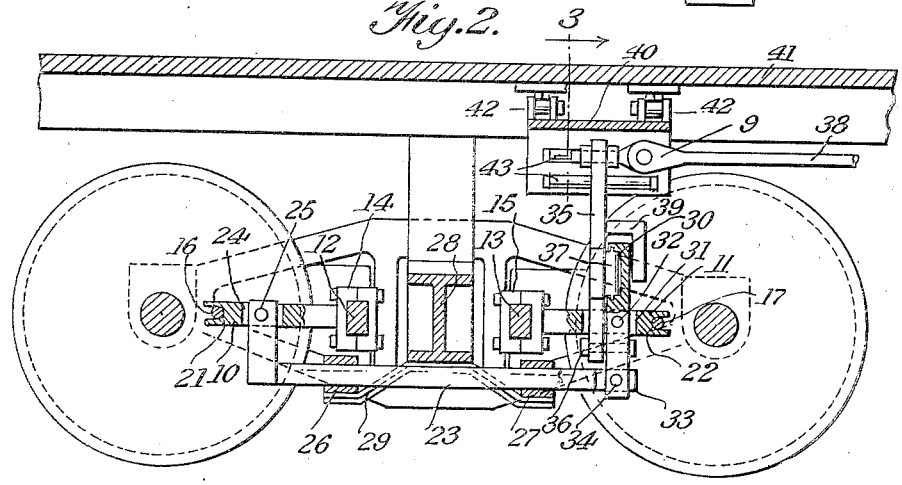
Figure 2 is a longitudinal sectional view taken on the line 2—2 of Figure 1.

Referring now to the drawings in which like characters of reference designate similar parts in the various views, the device is shown to comprises a pair of struts 10 and 11 secured to conventional brake beams 12 and 13 through the medium of respective two part clamps 14 and 15, V-shaped braces 16 and 17 being connected to the ends of the beams at the brake shoes 19 and 20 and engaged at their central portions in notches 21 and 22 in the ends of the struts. Each strut is in the nature of a rectilinear bar.

An L-shaped push rod 23 has an upwardly extending short leg engaged in an opening 24 formed in the strut 10 and pivotally secured in the opening by a pivot pin 25. The push rod is supported for endwise sliding movement in guide sleeves 26 and 27 which are rigidly secured to the bolster 28 by four or more pairs of obliquely related brace rods 29 which are rigidly bolted or otherwise secured at their confronting ends to the bottom of the bolster 28.

A lever extension 30 extends vertically through an opening 31 in the strut 11 and is pivoted in the opening at a point between its ends by a pivot pin 32. The lever extension is pivoted at its lower end in a fork 33 formed at the opposite end of the push rod from the short leg, through the medium of a pivot pin 34.

An operating lever 35 extends upwardly along the lever extension 30 and is pivotally connected to the lever extension through the medium of a pivot pin 36, the operating lever thus being adapted to swing laterally with relation to the lever extension. The lever extension is provided with rollers 37, see Figure 7, to permit it and the operating lever to move freely relatively, when the car is making a right or left curve.

The upper end of the operating lever is connected to a connecting rod 38, by a shackle 9, and the connecting rod is connected to the piston of the conventional air drum for applying or releasing the brakes. An inverted L-shaped guide 39 is secured to the operating lever 35 and extends downwardly upon the rear side of the lever extension 30 to confine the rollered side of the lever extension against the operating lever.

The upper end of the operating lever is positioned in a guide 40 of inverted U-shape and which is pivotally connected to the bottom 41 of the car through the medium of hinges 42 which permit the guide 40 to swing laterally. Rollers 43 are secured to the inner faces of the downwardly extending legs of the guide 40, see Figures 3 and 4, to permit the operating lever 35 to move freely with relation to the guide.

It will be pointed out that the brace rods 29 prevent the push rod 23 from turning to the right or to the left so that the push rod is confined to rectilinear movement and thus a cause of more wear on one side of the brake shoes than the other, is eliminated.

When the operating lever 35 moves back and forth under impulse of the connecting rod 38 the guide 9 takes care of all necessary length in all movement of the parts. The rollers of the lever extension and of the inverted U-shaped guide create free movement without binding.

From the above description it is thought that the construction and operation of the invention will be fully understood without further explanation.

What is claimed is:

1. The combination with a car and the brake beams and the bolster thereof, of rectilinear struts secured to the brake beams, said struts being provided with respective openings, an L-shaped push rod having a vertical leg pivoted in the opening of one strut and having a long horizontal leg, means carried by the bolster in which said horizontal leg is slidably mounted a vertically disposed lever extension pivoted at a point between the ends in the opening in the other strut and pivoted at the lower end to the end of the long leg of the push rod, a vertically disposed operating lever, means connecting the operating lever to the lever extension for forward or rearward movement therewith and for lateral swinging movement with relation thereto, an inverted U-shaped guide hinged to the bottom of the car, the upper end of the operating lever being disposed in said guide, said guide being adapted for lateral swinging movement, and a connecting rod loosely connected to the upper end of the operating lever and adapted to be connected to a conventional air operated piston for moving the operating lever to move the brake beams forwardly or backwardly in a rectilinear direction.

2. The structure as of claim 1 and in which the lever extension is provided with rollers, and an angular guide on the operating lever engaging the lever extension and holding the rollers against the operating lever to permit the operating lever to move freely relatively to the lever extension when the car is making a right or left curve.

3. The structure as of claim 1 and in which the inverted U-shaped guide is provided with rollers on the inner faces of the downwardly extending legs thereof to engage the upper end of the operating lever.

PERRY W. HOSHOR.